(12) United States Patent
Salmanson et al.

(10) Patent No.: US 11,301,495 B2
(45) Date of Patent: Apr. 12, 2022

(54) ENTITY RESOLUTION COMPUTING SYSTEM AND METHODS

(71) Applicant: Cherre, Inc., New York, NY (US)

(72) Inventors: L D Salmanson, New York, NY (US); Ben Hizak, West New York, NY (US); Zav Shotan, New York, NY (US)

(73) Assignee: Cherre, Inc., New York, NY (US)

( * ) Notice: Subject to any disclaimer, the term of this patent is extended or adjusted under 35 U.S.C. 154(b) by 719 days.

(21) Appl. No.: 16/198,735

(22) Filed: Nov. 21, 2018

(65) Prior Publication Data

US 2019/0236082 A1    Aug. 1, 2019

Related U.S. Application Data

(60) Provisional application No. 62/589,210, filed on Nov. 21, 2017.

(51) Int. Cl.
*G06F 16/28* (2019.01)
*G06N 7/00* (2006.01)
*G06N 3/08* (2006.01)
*G06Q 50/16* (2012.01)

(52) U.S. Cl.
CPC ........... *G06F 16/285* (2019.01); *G06N 3/08* (2013.01); *G06N 7/005* (2013.01); *G06Q 50/163* (2013.01)

(58) Field of Classification Search
CPC ... G06F 16/313; G06F 16/285; G06Q 50/163; G06N 3/02; G06N 3/084; G06N 3/08; G06N 7/005
See application file for complete search history.

(56) References Cited

U.S. PATENT DOCUMENTS

| 9,992,209 | B1* | 6/2018 | Keralapura | G06F 16/313 |
| 2004/0254803 | A1* | 12/2004 | Myr | G06Q 10/04 |
| | | | | 705/306 |
| 2006/0111847 | A1* | 5/2006 | Pearson | G16H 10/20 |
| | | | | 702/19 |
| 2010/0033754 | A1* | 2/2010 | Okita | G06F 3/1208 |
| | | | | 358/1.15 |
| 2010/0223258 | A1* | 9/2010 | Ghahramani | G06F 16/583 |
| | | | | 707/723 |
| 2012/0246060 | A1* | 9/2012 | Conyack, Jr. | G06Q 40/02 |
| | | | | 705/38 |

(Continued)

OTHER PUBLICATIONS

"Permutation and Combination Calculator", printed from https://www.calculator.net/permutation-and-combination-calculator.html, accessed Nov. 9, 2018.

*Primary Examiner* — Etienne P Leroux
(74) *Attorney, Agent, or Firm* — Dovas Law, P.C.

(57) ABSTRACT

A computer method for resolving entity identity. The method includes recording a plurality of entities by denoting a plurality of attributes about the plurality of entities via a plurality of labels comprising a plurality of data sets. A plurality of connection conditions between the plurality of data sets are determined, the plurality of connection conditions comprising a plurality of weight conditions. The plurality of weight conditions are reduced based on a probability function. The plurality of data sets are separated into a plurality of data subsets based on the plurality of weight conditions of the plurality of connection conditions to identify particular attributes of the plurality of data subsets, and the particular attributes of the plurality of subsets are transmitted.

18 Claims, 14 Drawing Sheets

(56) References Cited

U.S. PATENT DOCUMENTS

| | | | |
|---|---|---|---|
| 2012/0323587 A1* | 12/2012 | Llosa | G06Q 50/16 |
| | | | 705/1.1 |
| 2013/0238621 A1* | 9/2013 | Ganjam | G06F 16/2465 |
| | | | 707/737 |
| 2015/0142708 A1* | 5/2015 | Jing | G06F 40/169 |
| | | | 706/12 |
| 2015/0193533 A1* | 7/2015 | Platt | G06F 16/2465 |
| | | | 707/723 |
| 2015/0338234 A1* | 11/2015 | Seastrom | G01C 21/3679 |
| | | | 701/409 |
| 2015/0363459 A1* | 12/2015 | Kadoda | G06F 16/1734 |
| | | | 707/736 |
| 2016/0092557 A1* | 3/2016 | Stojanovic | G06F 16/254 |
| | | | 707/723 |
| 2017/0150103 A1* | 5/2017 | Cronin | G06F 16/9538 |
| 2017/0212953 A1* | 7/2017 | Oberhofer | G06F 16/285 |
| 2017/0228464 A1* | 8/2017 | Tam | G06F 16/335 |
| 2018/0212996 A1* | 7/2018 | Nedeltchev | H04L 67/12 |
| 2018/0217739 A1* | 8/2018 | Jain | G06T 11/60 |
| 2018/0239992 A1* | 8/2018 | Chalfin | G06K 9/00986 |
| 2019/0095946 A1* | 3/2019 | Azout | G06N 20/00 |

\* cited by examiner

FIG. 3B

| | | | |
|---|---|---|---|
| Estimated Deal Price: | | | $1,000,000 - $2,000,000 |
| Purchase Amount | $1,000,000 | - | $2,000,000 |
| Mortgage balance | $0 | - | $0 | Amount still owed by seller |
| For the Seller | | | $90,970 - $221,570 |
| Broker's Commission | $60,000 | - | $120,000 | 6% Rate |
| Seller's Attorney | $1,500 | - | $3,000 | |
| Managing Agent Fee | $250 | - | $250 | |
| Move-Out Fee | $250 | - | $1,000 | |
| Co-op Attorney | $400 | - | $500 | |
| Flip Tax | $10,000 | - | $60,000 | 1-3% Rate. Generally paid by the seller, except for sales by Sponsor |
| Stock Transfer tax | $N/A | - | $N/A | |
| New York City Transfer Tax | $14,250 | - | $28,500 | 1% of sales price if sales price is $500,000 or less; 1.425% of sales price if sales price is greater than $500,000 |
| New York State Transfer Tax | $4,000 | - | $8,000 | $2 for every $500 of the sales price or portion thereof |
| Payoff Bank Attorney | $300 | - | $300 | |
| UCC 3- filing fee | $20 | - | $20 | |
| For the Purchaser | | | $12,350 - $23,950 |
| Purchaser's Attorney | $1,500 | - | $3,000 | $1,500-$3,000+ |
| Recognovitan Agreement Fee | $250 | - | $250 | |
| Lien Search | $400 | - | $500 | |
| Move-In Fee | $N/A | - | $N/A | |
| Maintenance Charge Adjustment | N/A | | | Prorated; Up to 1 month |
| UCC-1 filing fee | $200 | - | $200 | |
| Mansion tax | $10,000 | - | $20,000 | The mansion tax is a 1 percent tax on sales of homes $1 million and more. |
| Bank Fees (if applicable) | | | $1,000 |
| Application/Credit Check Fees | $500 | - | $500 | |
| Bank Attorney | $500 | - | $500 | |
| Short term interest | Prorated; up to 1 month | | | (not included in total) |

RESIDENTIAL    NEW DEVELOPMENT

Unit: 220 Riverside Blvd, New York, NY 10069, USA, 14f

Details: Amount of rooms, bedrooms and unit size
- ● I know the size, rooms, beds and baths ($0)
  - Rooms: 2
  - Bedrooms: 5
  - Bathrooms: 2
  - Size (sqft): 2500
- ○ I need help with research ($50)

Delivery: Choose delivery term

270

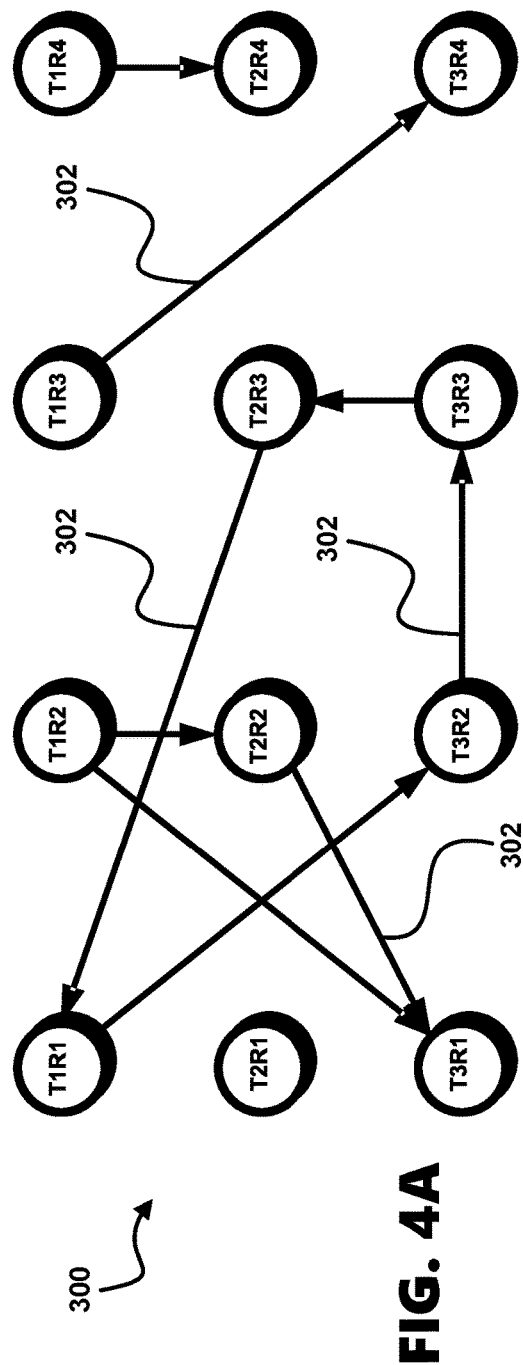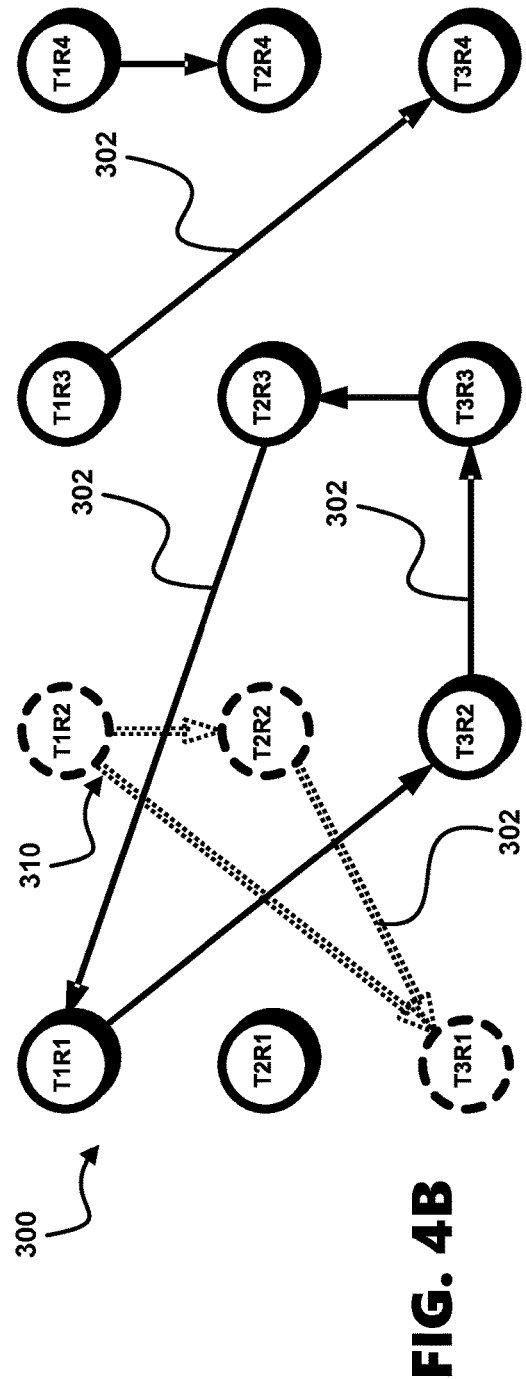
FIG. 4A
FIG. 4B

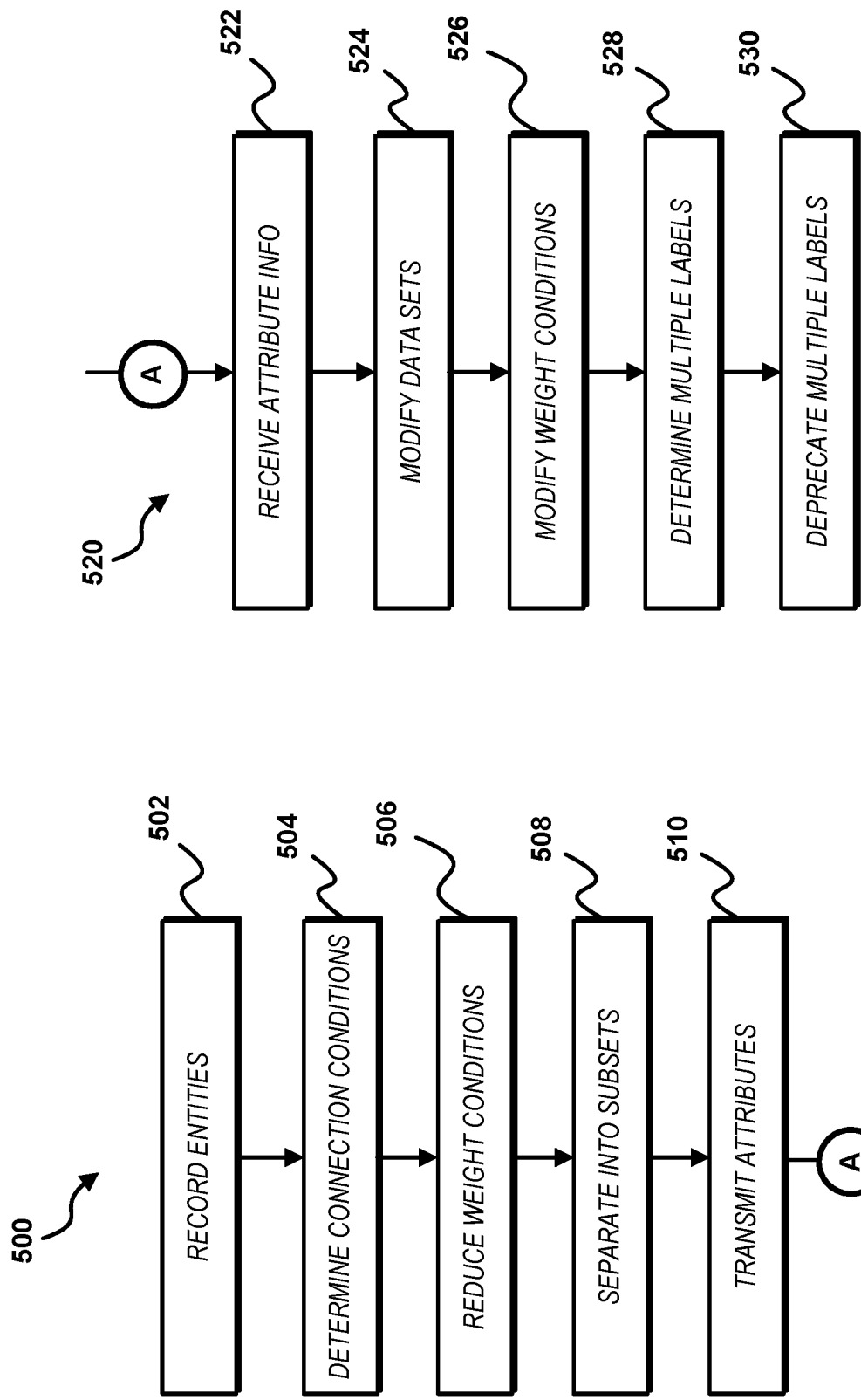

ENTITY RESOLUTION COMPUTING SYSTEM AND METHODS

CROSS REFERENCE TO RELATED APPLICATION(S)

This application claims the benefit of U.S. Provisional Application No. 62/589,210, filed Nov. 21, 2017, which is incorporated by reference as if fully set forth.

BACKGROUND

Computer systems need to be able to identify, store, and recall indications of real world entities. Computer systems in communication with each other may further need to resolve identities of entities, that is to agree whether two identities are the same or not, in order to exchange information about a given entity and retain information about the entity, without having complete information. When multiple computer systems in a computer network are required to exchange data relating to a particular entity to facilitate a transaction, resolving identities becomes more challenging. The resolving of identities of entities is frequently time sensitive, and delays in resolving an entity may affect the ability of a transaction to be completed.

Many industries rely on publicly sourced network-accessible data, the quality and accuracy of which is not always easily ascertained. Resolving entities based on such data can be computationally intensive based on the volume and quality of the data. The real estate industry in particular is faced with data from various disparate municipalities which is maintained at different levels of government, including for example borough, city, county, and state governments.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer method is provided for resolving entity identity. The method includes recording a plurality of entities by denoting a plurality of attributes about the plurality of entities via a plurality of labels comprising a plurality of data sets. A plurality of connection conditions between the plurality of data sets are determined, the plurality of connection conditions comprising a plurality of weight conditions. The plurality of weight conditions are reduced based on a probability function. The plurality of data sets are separated into a plurality of data subsets based on the plurality of weight conditions of the plurality of connection conditions to identify particular attributes of the plurality of data subsets, and the particular attributes of the plurality of subsets are transmitted.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 3A-3H show screen displays enabled by a collection API in a productivity portal;

FIGS. 4A and 4B show an exemplary connection graph for figuratively describing the resolving of an identity of an entity;

FIGS. 5A-5E are flow charts describing methods for resolving entity identities according to illustrative embodiments.

DETAILED DESCRIPTION OF ILLUSTRATIVE EMBODIMENT(S)

Figure 1:
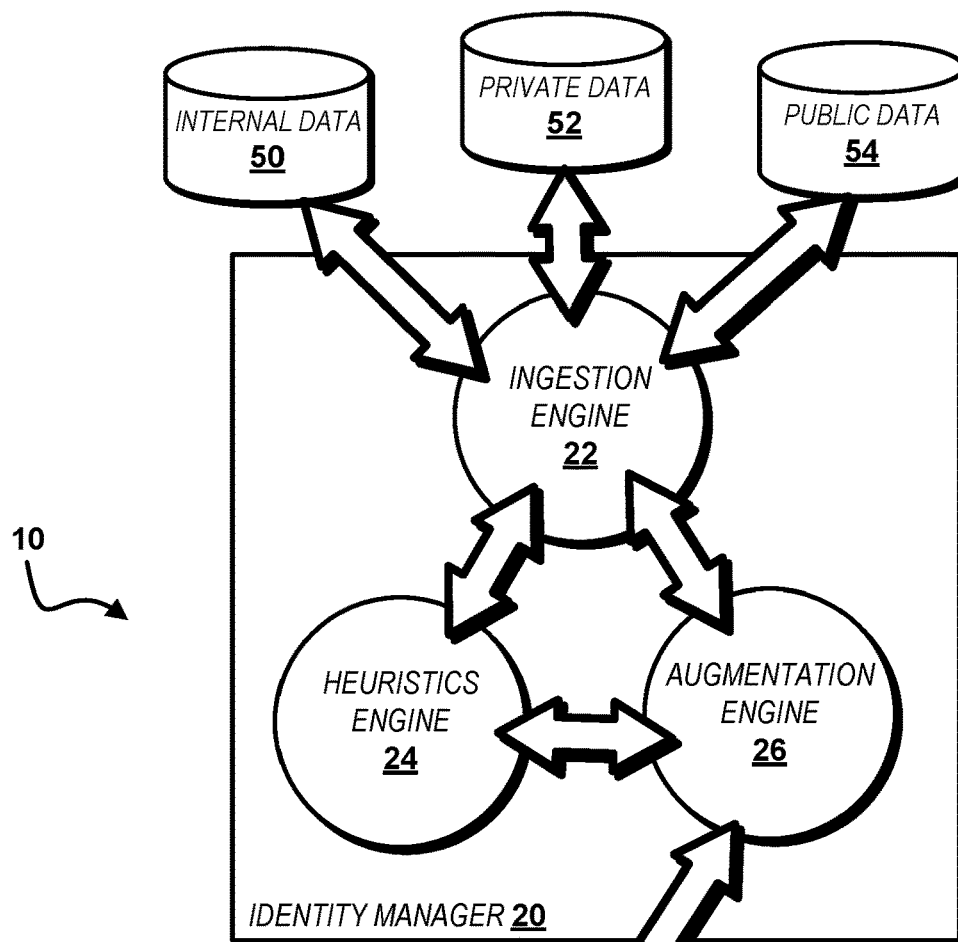
FIG. 1 is a diagram showing a system including an identity manager for resolving entity identity according to an illustrative embodiment.

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Terms

The following is a glossary of terms that may appear herein:

Entity—An object in the real world (e.g., a human, a building, or a document), virtual or legal objects (e.g., a human's right to live in a building), a group of objects of the above that has relevance for discussion and/or trade.

Discussion—an exchange of information about an identity, including information about the existence, or lack of existence of an entity.

Transaction—the buying, selling, or other transacting of an underlying entity or information about the entity.

Attribute—a piece of information that has been provided as input to a computer system, irrespective of whether such information is correct or incorrect. An attribute may include a label indicated by some external system (e.g., a government computer system) for an entity to which the attribute references.

Label—a set of symbols (e.g., "abc", "124" or "132-X-1982379") which identifies an entity in a computer system, irrespective of whether the entity identification is strong or weak or false or later deemed to be false, or whether the entity never or no longer exists in the real world.

Scope—an array of uses for which the label is good. For example, one label can be good for information exchange, but not good for transaction. The set of scopes associated with a particular label may change with time.

Label quality—a labeling is of high quality if there is high certainty that the entity exists and/or the label includes a reference to an authoritative computing system (i.e., a trusted computing system). For example, a person's social security number ("SSN") can be considered a high quality labeling of a United States tax payer in that it asserts that the person exists and/or that the person is separate from another human being with a different SSN.

Label permission—an indication of what operations are permitted on the entity, for example, a label which includes a reference. A label permission or scope can be derived from a connection graph, described herein, and can be amorphic and depend on the information requested.

Core defining attribute—an attribute defining a one to one relationship or a many to one relationship. Examples of core defining attributes include a person's social security number ("SSN"), corresponding to a one to one relationship as one person can have only one SSN, or a building having three addresses corresponding to a many to one relationship (where the many are unique) as no other building will have the same three addresses.

Referring to FIG. 1, a system 10 for resolving entity identity is provided in a communications network 8 including one or more wired or wireless networks or a combination thereof, for example including a local area network (LAN), a wide area network (WAN), the Internet, mobile telephone networks, and wireless data networks such as Wi-Fi™ and 3G/4G/5G cellular networks. The system 10 includes a network-accessible processor-enabled identity manager 20 used in accessing data stores of varied identifying information, including for example data stores 50, 52, 54. The identity manager 20 is accessible by client computer systems 40, 42, 44. While the operation of the identity manager 20 is described herein with respect to network-connectable client computer systems 40, 42, 44 and data stores 50, 52, 54, one skilled in the art will recognize that the identity manager 20 can operate with other suitable wired or wireless network-connectable computing systems. The identity manager 20 includes an ingestion engine 22, a heuristics engine 24, and an augmentation engine 26. The identity manager 20 can be implemented on one or more network-connectable processor-enabled computing systems, for example in a peer-to-peer configuration, and need not be implemented on a single system at a single location. The identity manager 20 is configured for communication via a communications network with the network-connectable client computing systems 40, 42, 44 which are identified for exemplary purposes as a broker system 40, a vendor system 42, and an agent system 44. The identity manager 20 has further access to an internal data store 50, a private data store 52, and a public data store 54, which are beneficially accessible via network communication.

Figure 2:
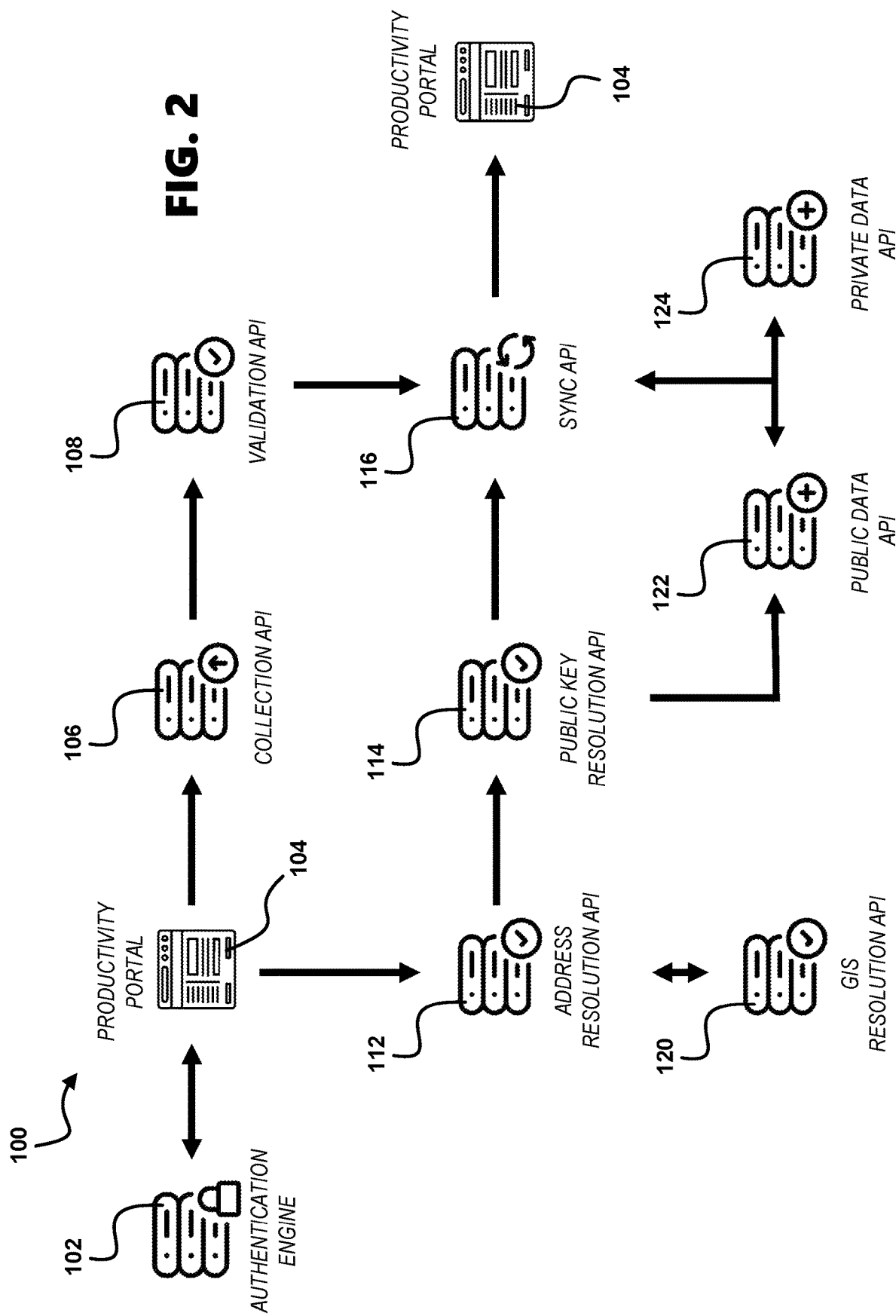
FIG. 2 is a diagram showing process flows of application program interfaces ("APIs") enabled by the identity manager of FIG. 1.
Figure 3A:
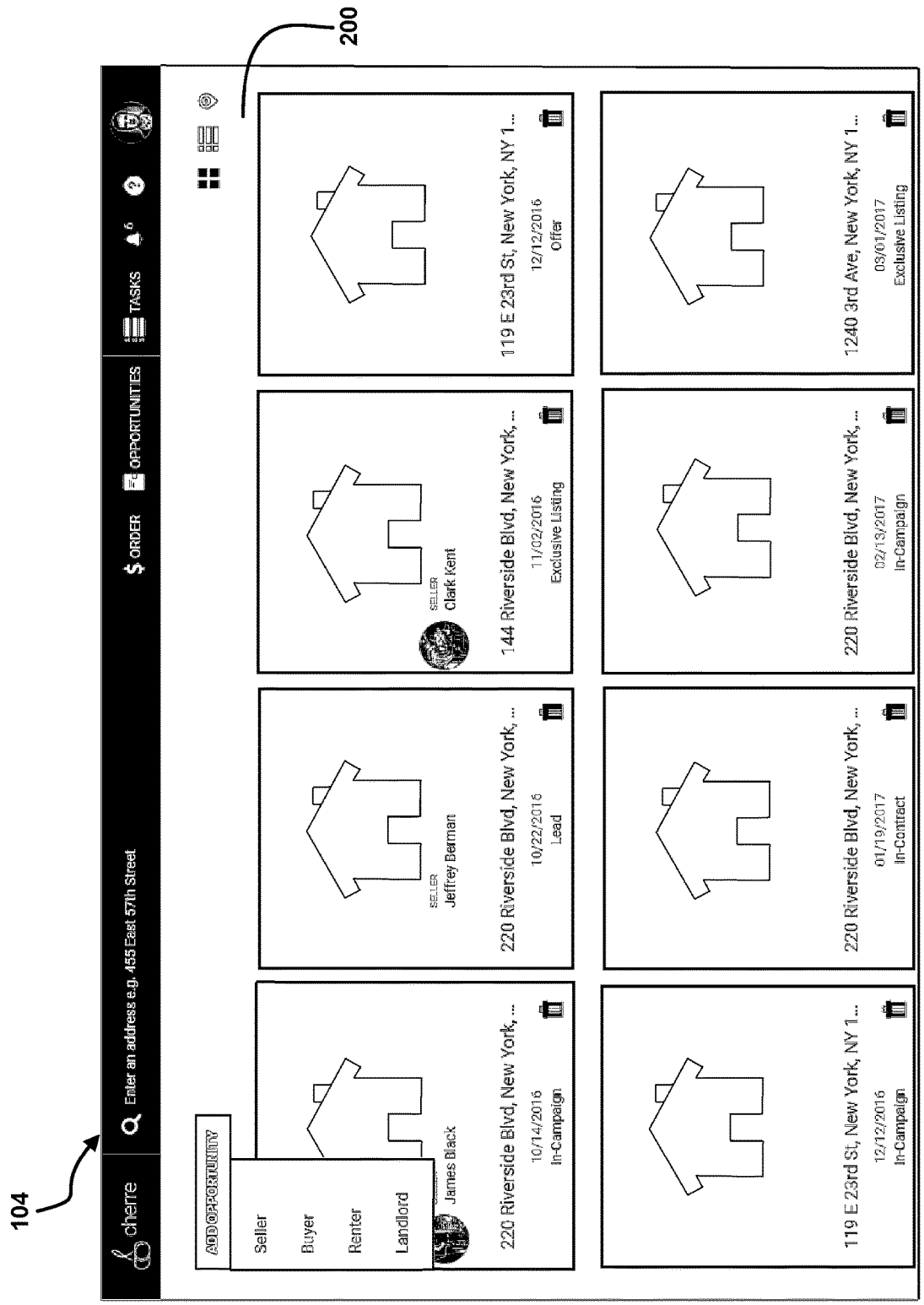
Figure 3C:
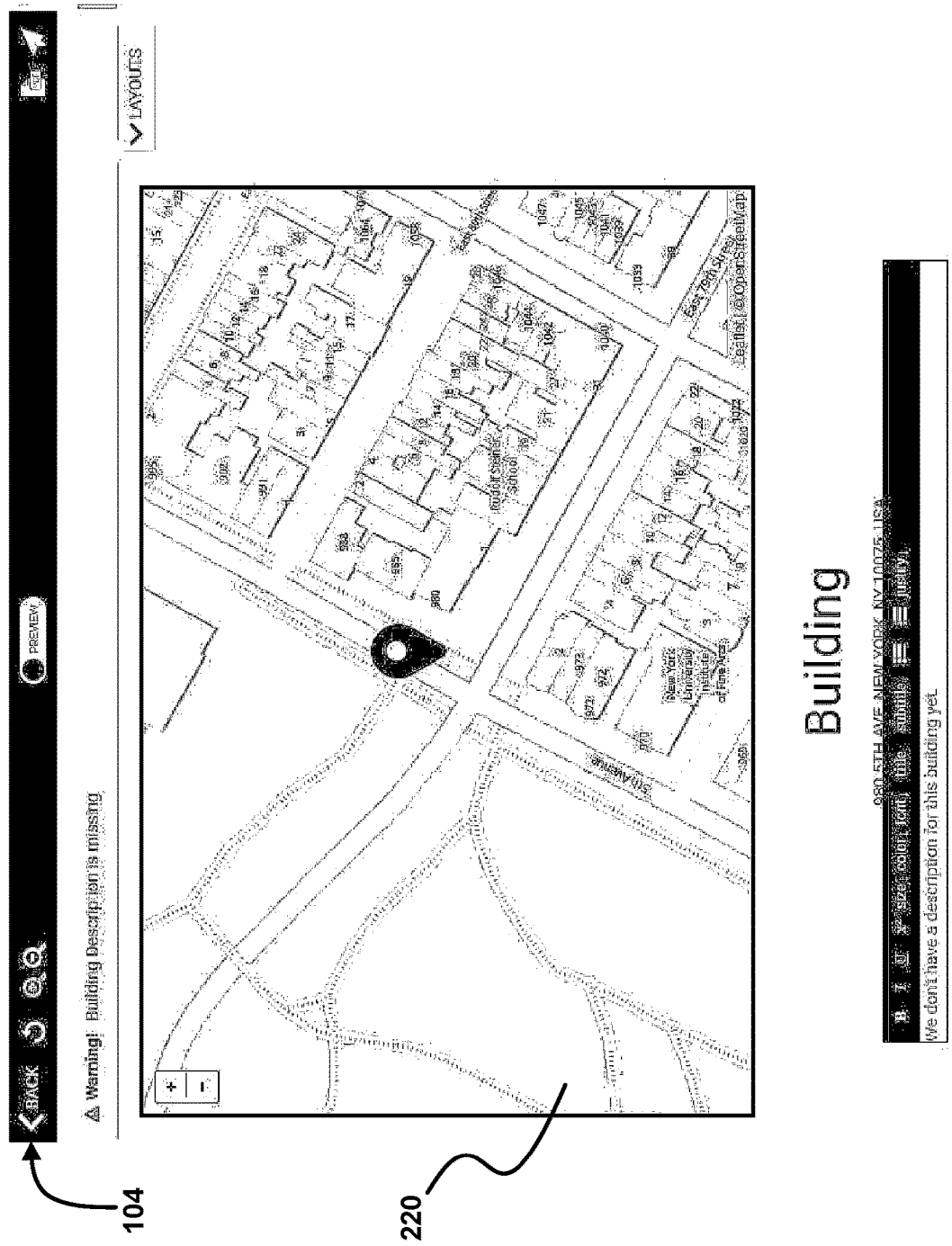
Figure 3D:
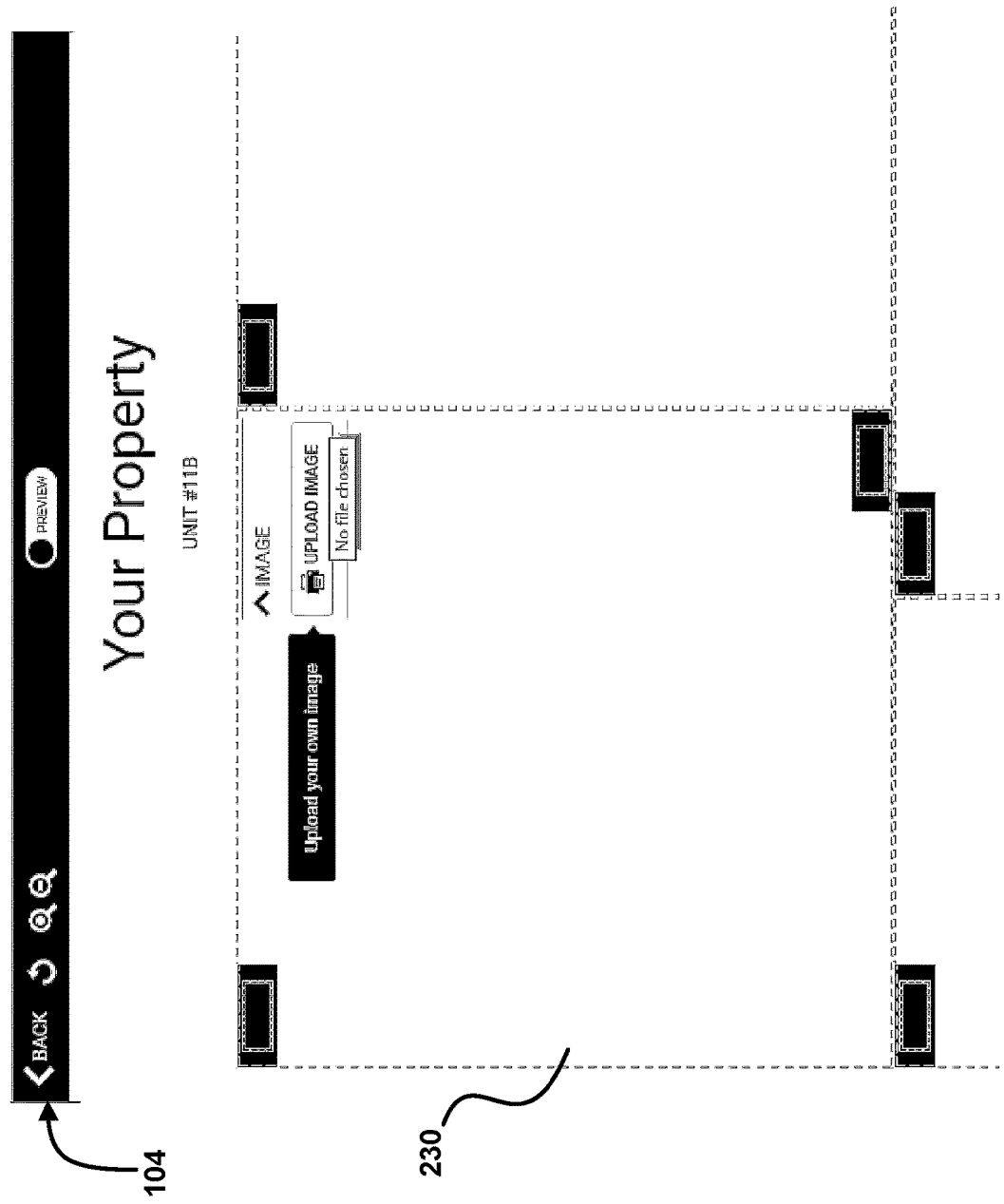
Figure 3F:
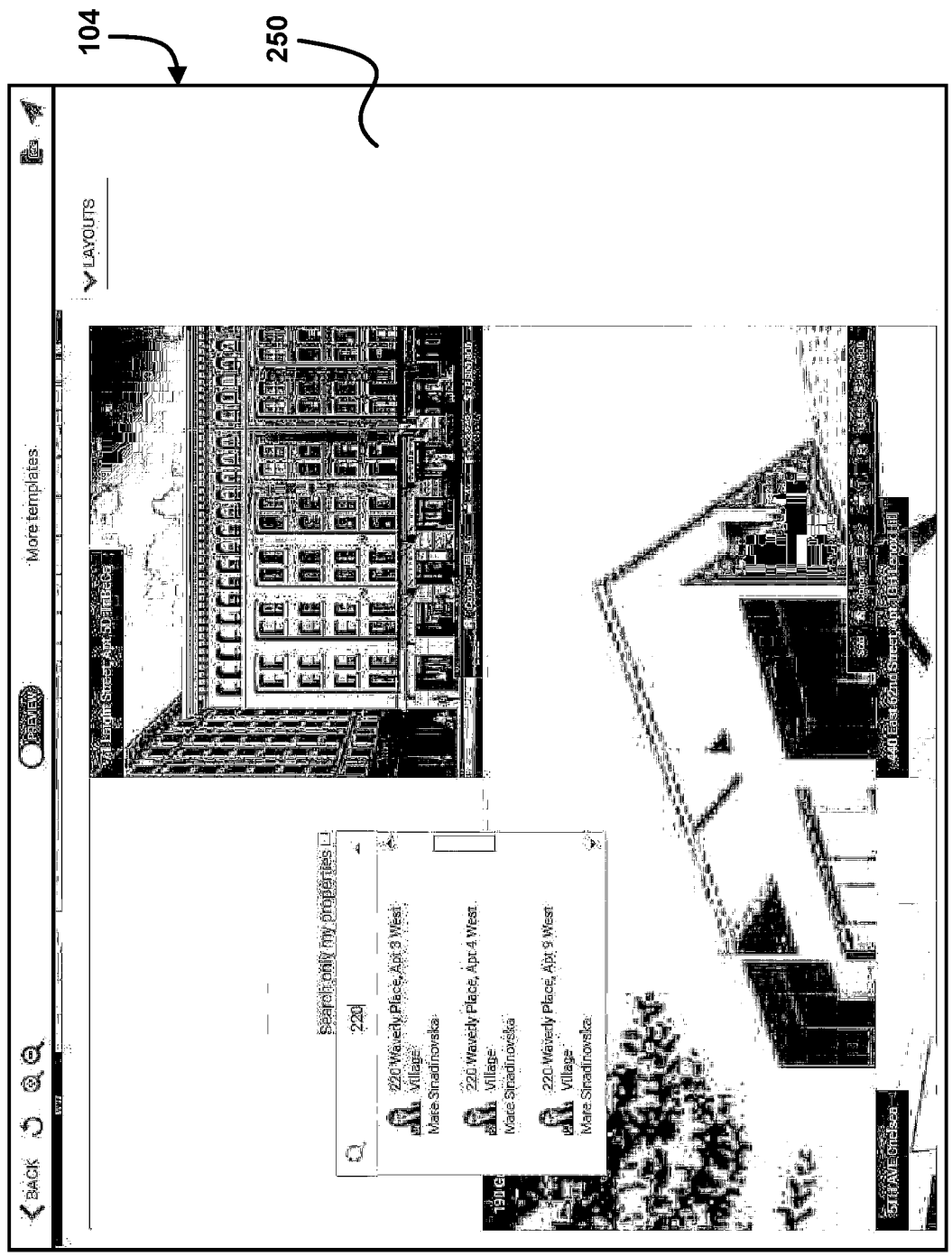
Figure 3G:
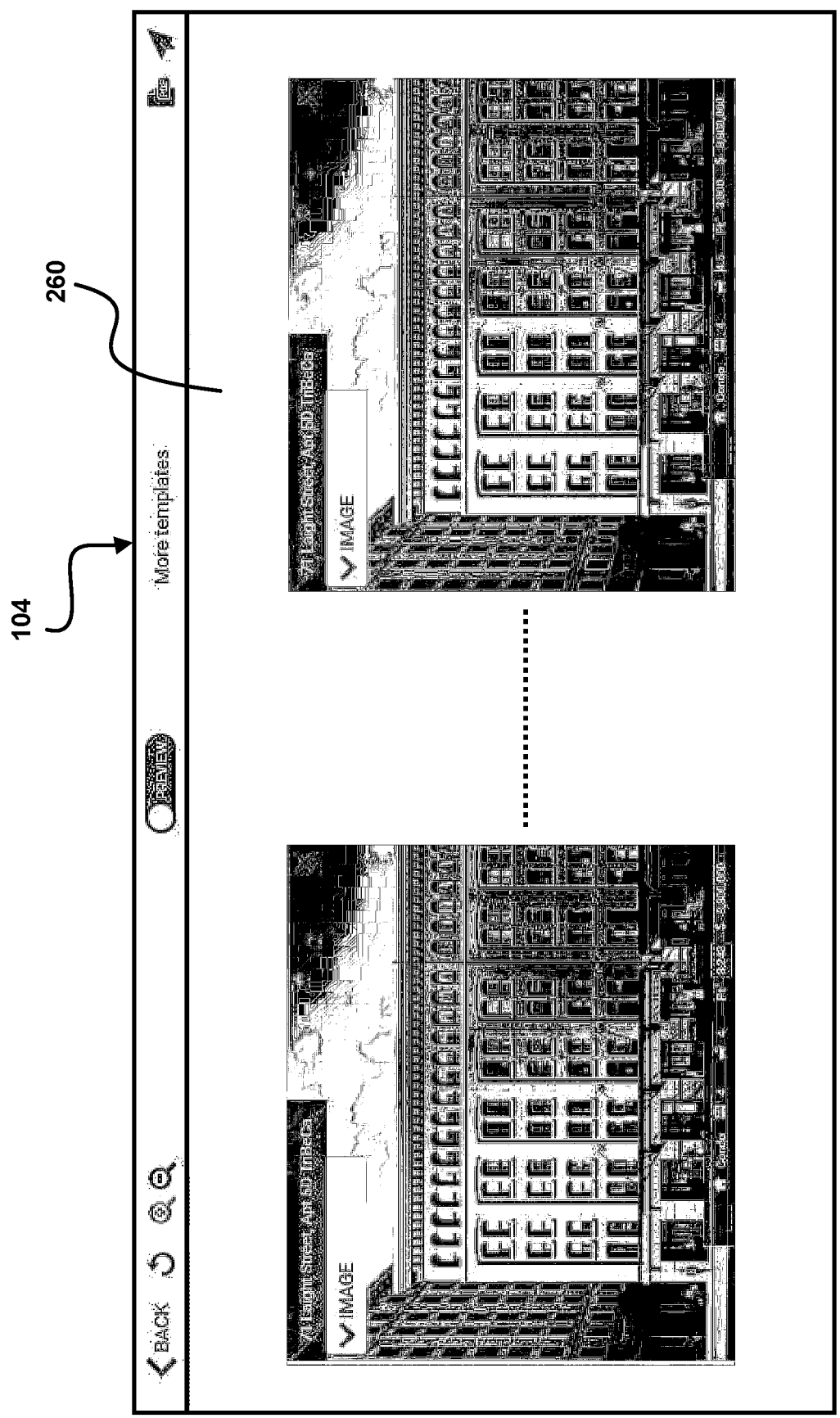

The identity manager 20 enables the acquiring, collecting, and analyzing of network-located data in real-time. The identity manager 20 can be implemented for example to collect and analyze non-public and public real estate data, which data can be rendered accessible to real estate brokers, vendors, and agents respectively via the broker system 40, the vendor system 42, and the agent system 44. Referring to FIG. 2, the identity manager 20 via the ingestion engine 22, heuristics engine 24, and augmentation engine 26 implements a plurality of network-situated application program interfaces (APIs) in an environment 100 to enable efficient collection and analysis.

An address resolution API 112 is configured to resolve and verify any address, place, or geographic range, and provide suggestions for wrong addresses. A key resolution API 114 (e.g., public key resolution API) is configured to return all required keys for public and private data sources providing datasets. A public data API 122 is configured to return latest and accurate information from public sources providing public datasets. In the context of real estate datasets, public sources can include for example networked computing systems hosting borough, city, and state real estate information regarding addresses, building details, geospatial data, and survey details. A private data API 124 is configured to return latest and accurate information from private sources providing public and or private datasets.

A collection API 106 is configured to systematically collect non-public asset data, for example non-public real estate asset data. In the context of real estate, the collection API 106 enables the platform to collect search queries related to address, lot, building, unit, real estate agent, real estate agent's firm, building owner, building staff, building developer, service providers, and permit holders. The collected data permits confirmation and validation of perceived address, asset interest (lot, building, and unit), and service provider, developer, and permit holder interest.

The collection API 106 implements an omni-search feature which saves location searches and determines the actual data record lookup or the actual location where the user traveled to based on mobile device geographical location, for instance based on GPS data or cell tower triangulation. For example a user may search "220 Riversdie Drive [sic]", but then navigate to an Internet address corresponding to a listing for 220 Riverside Blvd, or alternatively, physically travel to 220 Riverside Blvd. The platform thereafter learns that when a user types "Riversdie Drive" they likely intended to type Riverside Blvd, and a suggestion or autocorrect can be applied in the user interface to funnel the user ("auto-funneling"). Rules for auto-funneling are learned by the system to direct users to correct locations in response to common search error inputs. In another example implementation of auto-funneling, one or more users may search 220 Riverside Blvd, even though the official address of that property is 280 W 72 St, the platform learns that real estate agents view 220 Riverside Blvd as the primary address, so the platform can later display in a user interface 220 Riverside Blvd as the primary address in response to subsequent user searches.

User searches can provide an indication of interest. A user may search because they have a lead, for example a buy-side or a sell-side lead for a parcel of real property, and the system can learn that a corresponding address is associated with a particular person or opportunity. The collection API 106 is configured to implement the above-described search processes for all users, for example realtors and service providers.

A Sync API 116 is configured to resolve internal and external data to any and all other sources in real time. In the context of real estate data for example, the platform is configured to resolve internal and external vendor data, including real estate listing data, Listing Management Systems data, internal broker databases, and other private data sources, to public data sources regardless of their primary key or whether the keys are unique or matching. The process takes addresses, Building Identification Numbers ("BINs"), and Borough/Block/Lot ("BBLs"), and normalizes them to multi-factor arrays that include all the various combinations that can be identified. Furthermore, similarity is identified when no such keys exists, but when strong enough signals can be identified to match the entities. For example, simplistically, when a property unit has the name "3-F" in Database A, and "306" in Database B, and the core properties of such unit are identified as the same, such as square feet, rooms, bedrooms, and bathrooms, and furthermore identified that no other such units match such criteria, it can be determined that these are the same unit. It is also learned from this that units in the building can take a letter or number form, interchangeably, and that the trailing letter corresponds to the trailing number—i.e. "06"="f".

The Sync API 116 employs a flagging process in which when a value is identified which does not match a particular record, the system contradicts the record and a flag is set. For example in a real estate context, a flag is set if a real estate agent inputs that a particular property is two bedroom, but one or more database records indicates the particular property has one bedroom. A flag can further be set for example if a real estate agent inputs that a particular property is on the 8$^{th}$ floor of a particular building, but one or more database records indicate that the particular building has only seven floors. When an entry is flagged a suggestion can be provided via the augmentation engine 26 to the user who inputted the contradicting data, which suggestion can include alternate input data, for example the closest field the user may have meant based on Elasticsearch™ suggestions. The platform enabled by the identity manager 20 can further gather information including other users' mistakes and corrections to enable machine learning. For example, if seventy five percent (75%) of users input the wrong apartment unit number, but all or a significant portion of users correct their input to the same apartment unit number, apartment unit #B3 to #3B, this can increase the rank and confidence level of the unit number accepted as correct by the platform. An autocorrect feature enables rules based on rank and confidence scores. Rules can be user set or machine-learned, for example "always trust data input from real estate agent X" or "never trust data input from real estate agent Y".

In a real estate context, real estate assets are typically identified by an address, Building Identification Number ("BIN"), Borough/Block/Lot ("BBL"), or X/Y coordinate(s). The platform resolves all of the above, depending on what is available for that dataset by adding the missing key(s). Each and every key is appended to all the other keys to create a master table of keys.

To discover addresses, the platform via the heuristics engine 24 identifies all relevant addresses for each and every building. If BIN or BBL is known, the lowest and highest address range for all streets surrounding that property are identified from city records. The address ranges for all addresses associated with a particular property are exploded. For example, a particular property is observed to correspond to 360 Riverside Blvd and 380 Riverside Blvd, so addresses in between are added (e.g., 362 Riverside Blvd). The system does this for all addresses on all sides of the block, wherein for example an alternative address may be on a different street from the listed address (e.g., 280 W 71st St). The platform is further configured to identify "vanity" addresses—addresses not officially registered with a city (e.g., 20 Rockefeller Plaza, New York, N.Y.) and repeat the process. Vanity addresses are identified for example by mining a networked system hosting a city violations list, which list shows property fines for having a non-official address which gives the address they use unlawfully. Optical character recognition (OCR) can be used to gather information from image-based documents.

To discover Building Identification Numbers ("BINs"), the platform via the heuristics engine 24 identifies all BINs associated with a property (e.g., not only those listed in a city's department of buildings). The identification is performed by searching BINs for all of the alternative addresses and BBLs, so BINs can be discovered that are not associated with the primary address or BBL. To discover Borough/Block/Lot ("BBL") information, the platform identifies all BINs associated with a property (e.g., not only those listed in a city's department of finance). This identification is performed by searching BBLs for all the alternative addresses and BINs, so BBLs can be discovered that are not associated with the primary address or BIN.

The address resolution API 112 is configured to resolve and verify any physical address, place, or geographic range, and provide suggestions for wrong addresses. The resolving and verifying includes a keyword search and semantic search to resolve addresses. Addresses mean different things to different people and APIs. A process is provided via the heuristics engine 24 which creates a baseline of a plurality of addresses currently identified through various APIs, and maps the addresses to their respective entities. For example it can be determined that a user may type "blvd." for "boulevard", or more complexly, "RSD" for "Riverside Drive". The identity manager 20 matches such possibilities ahead of time, and the identity manager 20 learns from the users and machine selections based on their suggestions what was actually meant, and stores these possibilities to be suggested in the future. After a particular number of times that a correction is implemented via a particular string, the identity manager 20 identifies such string as the primary address.

Keyword and semantic searching alone may not lead to a definitive resolution of an address. The identity manger 20 can further validate physical addresses based on particular network-accessible databases, for example a network-accessible United States Post Office database. The address resolution API 112 can further enable address suggestions to system users which can be confirmed by a user to assist in the validation process. The address resolution API 112 is supplemented by a geographic information system (GIS) API 120 which can provide geolocation suggestions, for example a map location, which suggestions can be confirmed by a user to assist in the validation process. The identity manger 20 as described validates whether an address is an actual address and matches it to the relevant public and private data sources.

A data validation API 108, automatically flags incorrect data. Incorrect public and private data is flagged. In the real estate context, residential listing anomalies can be flagged for example. The platform further allows for manual flagging by users. The platform further identifies sources of anomalies, and suggests how best to resolve, while taking into consideration the intricate dependencies of data structures currently present. Suggestions provided to a user are beneficially reader friendly. The identity manager 20 via the heuristics engine 24 is also capable of automatically correcting anomalies on an ongoing basis and addressing multiple use case scenarios.

When it is identified that users or data store APIs provide an incorrect value, the identity manager 20 can flag the incorrect value at multiple layers. First, if the value is categorically wrong, for example an identified building property does not exist, and no similar entity can be identified, the identity manager 20 can flag or block the entry entirely. Second, if the identity manager 20 identifies a common mistake, the identity manager 20 can flag, or correct the value proactively. A common mistake for example includes a real estate agent entering the address "220 Riverside Drive" for a listing when no such building exists. However, "220 Riverside Blvd," which is the same street physically, but geographically further south exists, is a residential building, and is commonly pinged through the API. The API can flag this error, or can correct proactively if the corresponding business rules permit. The identity manager 20 can also setup more complex business rules, for example enabling autocorrect of an error that has been approved manually after being flagged a particular number of times. Further, multiple business compliance rules can be addressed by the platform.

Productivity portals 104 enable collection of data from and output of data to user devices, for example client computer systems 40, 42, 44, which users are authenticated via an authentication engine 102. Referring to FIGS. 3A-3H, a plurality of displays are enabled by the collection API 106 though the productivity portal 104. A portfolio display 200 enables a listing of entities including identified real properties associated with a user of a client computer system 40, 42, 44, a user for example including a property buyer, property seller, property renter, or landlord. A searching display 210 displays entities including identified property units based on user input of a property address. A mapping display 220 enables the display of geographic locations of identified properties. A user image display 230 enables upload by a user via a client computer system 40, 42, 44 of images associated with an entity including an identified property. A cost display 240 shows projected sale costs of an entity including an identified property. A history display 250 shows entities including currently selling and recently sold properties of a particular user, for example a real estate agent's portfolio of properties. An asset correction display 260 permits a user to correct data corresponding to particular entity including a real property asset, for example to correct the floor area of a particular apartment in building. An asset feature collection display 270 permits a user to populate data fields corresponding to particular entity including a real property asset, for example to indicate the number of bedrooms and bathrooms of a particular apartment in building.

The identity manager 20 is enabled to record an entity by denoting all of the known attributes about an entity using a label. For example for two different labels X,Y:

Label: X denotes {attribute A:valueX1, attribute B:ValueX2}

Label: Y denotes {attribute A:valueY1, attribute B:ValueY2}

Initial labeling can be performed for example by naively attaching a label to a given data source data set such as a data table row accessed from a private data store 52 or public data store 54. The identity manager 20 via the augmentation engine 26 can record a merge when two labels are asserted to be identifying the same entity and record an anti-merge when two labels are asserted to be identifying a separate entity. Using the records so aggregated, the identity manager 20 can generate an inference that two entities are the same through the application of additional data for example a list provided by a trusted authoritative system such as a government-maintained public data store 54. In order to trade data about entities, or trade actual entities, computer systems need to identify ("enumerate") the entities. Without labeling, two computer systems may not be able to agree that two entities are indeed the same. This would prohibit discussion, sale of entities (e.g. transfer of ownership on an object), or trade of data about entities.

An entity is deemed labeled by the identity manager 20 when it is recorded and given an identifier. An entity can be labeled by attributes, where attributes are recorded which fully or partially identify the entity in the world. Alternatively, an entity can be labeled by reference. References are recorded which identify the entity as existing in some other system, such as in public data store 54 (e.g., a governmental data store). Labeling by reference is a special case because a very trusted data store can itself be an indication that a particular entity exists.

The identity manager 20 is beneficially configured to perform identification decisions in "real time", where "real time" is the interval by which time a transaction is no longer deemed relevant. This real time in which it takes to make a transaction is an upper limit on the number of transactions that may be discussed. What may be considered "real time" is constantly being made shorter firstly by the processing speed of computer systems and secondly by markets being unwilling to wait for transactions to be approved. A delay in processing beyond real time may prevent a transaction from occurring.

The identity manager 20 is configured to address challenges involving determining that a particular label (e.g., "X") and another particular label (e.g., "Y") define one particular entity. Challenges include that the data for deciding that X is Y may not reside in one place and may not be available at the time X and Y were labeled. The data for deciding may be distributed such that information about X is not available within a reasonable time to a system which asserts that Y exists. The information for resolving that X is Y may not be humanly resolvable due to the quantity of data. Moreover, resolving that X is Y may not be humanly possible due to complexity of computation, especially in the case of multi-dimensional entities, for example in the case of a 3 dimensional object in a physical space and the decision on whether another object occupies the same space.

The identity manager 20 is configured to identify, store, and recall indications of real world entities. The identity manager 20 is enabled to resolve entities, particularly to make a determination whether two entities are the same or not in order to facilitate exchange of information about the entity or entities and to retain information about a given entity without having complete information about the entity. Resolving entities can be performed even if relevant information does not reside in a single domain, for example requiring more than one of geospatial analysis, government record analysis, market data analysis, and human input analysis.

At a high level, the identity manager 20 given a set of inputs makes a determination of which entities exist, for example, in a real estate context which buildings exist. Given the same set of inputs or any other set of inputs that may contain the same label identifiers, the identity manager 20 makes a determination of which entities belong to which label. The identity manager 20 further collects and identifies key points in an entity's life, for example birth date (when the entity was created or born), death date (when the entity ceased to exist), and states in the life of the entity. States in the life of an entity corresponding to a real estate property for example may include a construction phase and a completion phase of the property. States in the life of an entity corresponding to a patent application can include for example the pending state of the patent application and the post-issuance state of the patent application. The identity manager 20 is configured for finding all real entities that data from the data stores 50, 52, 54 hints on or points to and for marking unique entities with only one label. Once a label is assigned, the same label is used for the same entity in the future.

Following is a data description of the labeling problem. Given n tables in tabular data form:

[a,b,c,d*] - Table 1, t1
[e,f,d*,a] - Table 2, t2
... Table n, tn.

Where * represents two table columns which may relate or identify entities, and given a set of identity conditions, $C(t1,t2 \ldots tk)$, $k \leq n$—between table rows, while assuming that there exists virtual/real entities to whom the data rows relate to, all unique underlying entities are to be found. For example, given two data tables for entities describing real persons having name, hair color, and Social Security Number ("SSN"), TableA(SSN, name) and TableB(SSN, hair color), our condition will be TableA.ssn=TableB.ssn. In this case the condition will return true (probability of 100%, connection weight of 1) for each unique SSN. From that it can be deduced (e.g., by the connection graph methodology described herein) that each SSN is an identity.

Varied methods for labeling can be employed, such as serial numbers, random numbers, and universally unique identifiers (e.g., uuid v4), so long as all labels are unique and labels can be created in parallel (e.g., parallel processing and multi-server).

In describing the solutions employed by the identity manager 20, provided herein are definitions of the data structural components including connections, connection graphs, and connection graph subsets. A connection between two sets of data (e.g., grouped as a data row) that may belong to the same data source or to multiple data sources is defined when a connection weight can be produced. A connection weight is for example a number between 0 and 1 that represents the strength of the connection where:

1 indicates a connection that represents an identity equality (e.g., X is Y);

0 indicates a connection is forbidden (e.g., X is not Y); and a value between 0 and 1 is a probability of identity equality.

A calculation of a condition between two sets of data may produce a connection weight or a non-connection. A non-connection indicates that two sets are not related and there is no connection between them. A connection weight between two data sets (e.g., data rows) is calculated by taking the multiplication of all the weights of all the connections between these two sets, or by other valid mathematical formulation that results in a connection weight as described above (i.e., a value between 0 and 1).

A connection graph is the collections of all connections between data sets in a considered set of data sources. A connection graph can include all connections in all data sources. Referring to FIG. 4A an exemplary connection graph 300 is shown in which arrow lines 302 are connections, each having a weight. The nodes of the graph are labeled by Table and Row of a corresponding data set (i.e., T1R1=table 1, row 1).

A graph subset is a collection of data sets and connections which under a specified separation condition, can be separated (not connected to) any other part of the connection graph. One example of a separation condition is two data sets are separated if the probability of identity between them is less than 0.5. In the above SSN example, data sets can be separated into ones that only include the same SSN. Referring to FIG. 4B the exemplary connection graph 300 is shown with an example graph subset 310 shown in dashed line including nodes T1R2, T2R2, T3R1. Beneficially, the earliest point in which the identity manager 20 labels (i.e., the point before which there is not an "entity") is the point in which a graph subset is identified. Other identifications can exist before the identification of a graph subset, but they are transient and do not fit the definition of a label.

The solution implemented by the identity manager 20 to find all entities given a particular data set involves the calculating of all the connection conditions known between all the applicable and desired data sets (e.g., rows) in the available data, resulting in multiple weight conditions for each connection. All weight conditions in each connection are reduced using a known probability function. In a basic implementation, this reduction can be performed by a multiplication of the weights, and in a more sophisticated implementation reduction can be performed by an application of an artificial neural network or other artificial intelligence classifier given a meaning of the weight data. The graph subsets are separated using a separation condition. A separation condition may have a context (e.g., the system is searching for buildings, apartments, people, or patents). In an exemplary basic implementation, separation can occur if a connection weight is less than 0.5. In a more sophisticated implementation separation can be determined by an application of an artificial neural network or other artificial intelligence classifier that determines the separation according to the connection structure (e.g., nearest neighbor or second nearest neighbor). Once the graph is reduced, the subsets in the graph define entities wherein each entity has "core defining attributes", a label, and a label quality. Two entities are the same when they point to the same graph subset, within a separation condition.

The solution implemented by the identity manager 20 allows for various expansions. Any condition may include one or more data source, and one or more steps. A calculated weight can be a result of an iterative procedure, beneficially confined between two sets of data. The weight calculation can be done by either a straight forward formula, which takes in only the two graph nodes in question or a more complicated procedure in which the connection weights to other nodes in the vicinity are taken into account. In the latter case, this connection weight calculation may be iterative, that is, in a first run the value is guessed, and in the next run the value is corrected further. Examples of this are the Monte Carlo algorithm or finding zero crossings for a function. Different conditions may require different weighting functions to apply. Though, for many practical implementations only a single weighting condition is required. A weighting function, may change from hard (i.e., most connections lean towards 0), to soft (i.e., most connections lean towards 1).

Time of execution, even for a powerful computer system, is limited. If a computing system tries to calculate all the relations between all data sets in the space of possibilities, the computing system will be faced with infinite time. For example, in New York City, N.Y. there are at least 50,000 buildings, where if one wants to estimate the total effect of a transaction corresponding to one building on another building, for example the purpose of estimating the price, one would need to calculate approximately, C(50000, 2)~=1, 249,975,000 combinations, where C(n,r) denotes a combination including a fixed number of elements r taken from a given set n. If three building groups are considered, there are 20,832,083,350,000 combinations.

In the naive solution, for the above example, one may think that this number can be reduced by reducing the number of buildings taken into account, per building, by taking only relevant neighbors. That is, a building at the edge of a particular city may not be included, unless there is some collaborative effect, into the price estimate of a particular building near the center of the city. But this is not correct since the price of the particular building does actually depend on building prices throughout the city, even those relatively distanced from the particular building.

The identity manager 20 is enabled to implement a number of techniques to address the problem of time of execution. In a first exemplary methodology, a mean field approximation is implemented. In the example above, the price of a building is a "perturbation"/"fluctuation" above a heat map of prices that lay across the city. The assumption is that the map, which is deduced by other means, changes much slower than a single building price. In a second exemplary methodology, "hotspots" are implemented, wherein the price of a single building for example can be determined by the price of hotspots (i.e., trend setters) and their applied weights. In a third exemplary methodology, the identity manager 20 finds the calculation anchors and calculates using iterations. Referring again to the example in which entities include a plurality of buildings in an area, if the identity manager 20 has access to data which locates each building, and a particular building can be identified, each pass on calculating the price of the particular building given its connections, specifically its relevant neighbors (e.g., buildings in the neighborhood and recent sales), leads to a better estimation of the price of the particular building. Since the entities are known in this case, calculations can be reduced just to relevant connections (or strong connections) between the entities. In the building example, we can perpetuate over say geographical locations, while applying other non-entity related attributes across the board. This allows for much faster calculations without losing much information, and without the chance that some properties do not actually represent entities.

The above three methodologies require computer processing power to implement. While it may be possible for a human to perform the second methodology in which a set of small and finite trend setters may for example indicate a building price evaluation, the second methodology may lead to large variations with respect to the identity of the trend setters and their ability to reflect the actual price. Humanly performing the first and third methodologies would be largely impractical and would likely produce inaccurate results. The time for a human to create a heat map of the first methodology would be very large due to the volume of information. If one would consider second nearest neighbor connections and combinations of more than two entities (e.g., buildings), human resolution is likely impossible. The above three methodologies are not amenable to human computation in view of speed requirements, number of elements in a data set, the number of steps in iterative processes, required quality of output, and the number of connections and combination of connections.

Referring to FIG. 5A, a flowchart shows a method 500 of resolving entity identities of a plurality of entities. While the method 500 and associated processes are described with reference to the components of the system 10 shown in FIG. 1, including the identity manager 20, the computer systems 40, 42, 44, and the data stores 50, 52, 54, the method 500 may alternatively be performed via other suitable systems.

In a step 502, the identity manager 20 records a plurality of entities by denoting a plurality of attributes about the plurality of entities via a plurality of labels including a plurality of data sets. The plurality of data sets can be from multiple domains or a single domain. The identity manager 20 further determines a plurality of connection conditions between the plurality of data sets, the plurality of connection conditions comprising a plurality of weight conditions (step 504). The plurality of weight conditions are reduced based on a probability function (step 506), and the plurality of data sets are separated into a plurality of data subsets based on the plurality of weight conditions of the plurality of connection conditions to identify particular attributes of the plurality of data subsets (step 508). Each of the data subsets beneficially includes a core defining attribute, a label, and a label quality. Each of the data subsets beneficially defines a single entity of the plurality of entities. In a step 510, particular attributes of the plurality of subsets are transmitted, for example via a network to a client computer system 40, 42, 44.

The plurality of weight conditions can be reduced in step 506 by applying a multiplier to the plurality of weight conditions. Alternatively, the plurality of weight conditions can be reduced by applying an artificial intelligence classifier, for example including an artificial neural network, to generate reduced weight conditions. For example, attaching one or more artificial neurons to either a subset or a pre-identified entity, a mapping network can be created that can learn by repetition and reverse feedback (e.g., via a training set) a required calculation. The layering of artificial neurons, as is required by an artificial neural network, include multiple layers per data subset/entity.

The plurality of data sets are can be separated into the plurality of data subsets based on the plurality of weight conditions being less than a particular threshold. Alternatively, a particular data set of the plurality of data sets can be separated into one or more particular data subsets of the plurality of data subsets defining a particular entity based on a classifier using as an input a connection structure of the particular data set, for example by a nearest neighbor search or a second nearest neighbor search. The calculation of any network entity can be defined as one that takes all the connections between the nearest neighbor, the second nearest neighbor and so on. For example, imagining a set of springs on a line in one dimension, if one calculates only the effects of each string on its neighbor the result is incorrect since there are "accumulated" effects from the entire sprint system. If the springs are weak enough, one may just take into account only second nearest neighbors or even just the nearest neighbor.

The plurality of entities described in the method 500 can include for example a plurality of real properties, and the plurality of attributes can include sale prices of the plurality of real properties. A price of a particular real property of the plurality of real properties can be estimated based on an indicated selling price of one or more others of the plurality of real properties and one or more connection weights of one or more connection conditions between the particular real property and the one or more others of the plurality of real properties. Estimating such price of the particular real property can include for example iteratively determining calculation anchors comprising particular subsets of the plurality of subsets which cannot be further reduced. For example a person's SSN, cannot be reduced anymore and accordingly points to an anchor. Multiple addresses, where the addresses are unique and do not point to each other (i.e., are not synonyms of each other) are also considered as pointing to an anchor. The anchors (e.g., entities, as in the case when these are grounded in the real world) can be deduced (e.g., by graph reduction) using an iterative process. A first iteration run can generate a first estimation of what is considered to be an anchor (e.g., an entity). Then in a second iteration run a better second estimation can be made of whether this is an anchor by merging or splitting the first estimation given new evidence that either did not exist or is a result of the first estimation. The same can be done for any calculation, a first estimation gives a value, and further iterations refine this value thus increasing the confidence in its correctness. Thus, in the case of estimating the value of a building, the first estimation might not include the effects of the whole city, but further iterations may include the effects of a wider geographic area.

Correction or modification to the generated attributes is possible for example by received corrected attribute information from a client computer system 40, 42, 44. Referring to FIG. 5B, a method 520 continues from method 500 at designator A. In a step 522, attribute information is received by the identity manager 20 via the collection API 106. The attribute information can include for example corrected attribute information provided by a user via a client computer system 40, 42, 44, or alternatively, internally generated second, third, or later iterations of attribute data, or corrected attribute algorithm data. The identity manager 20 modifies the plurality of data sets based on the received attribute information (step 524) and modifies the plurality of weight conditions (step 526). The identity manager 20 further determines that a particular data subset of the plurality of data subsets has multiple labels based on the modifying of the plurality of weight conditions (step 528) and deprecates one or more of the multiple labels (step 530). For example a label exists for a real world entity AB such as a building property, but it is found that AB does not exist, and the entity is actually two entities A and B, so one of the entities (A or B) is deprecated.

Figure 5D:
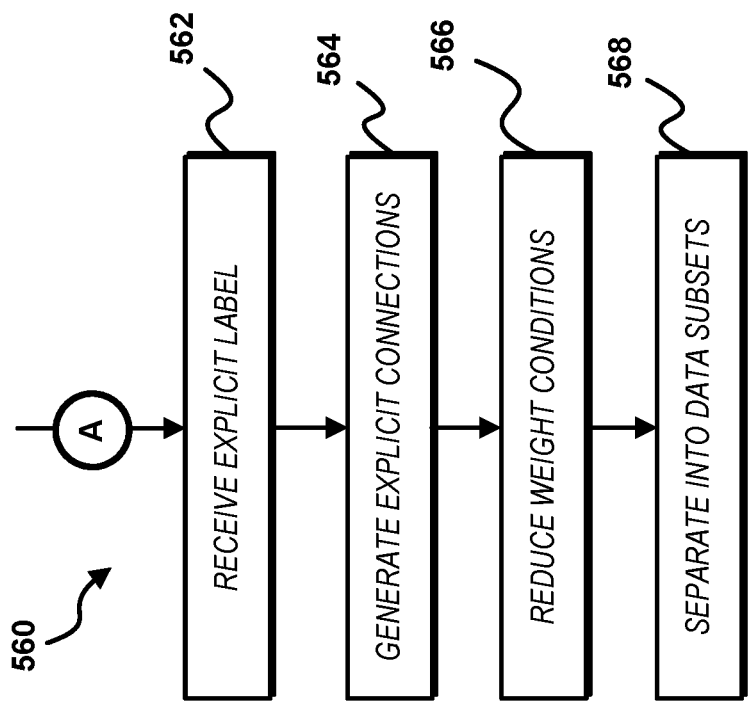
Figure 5C:
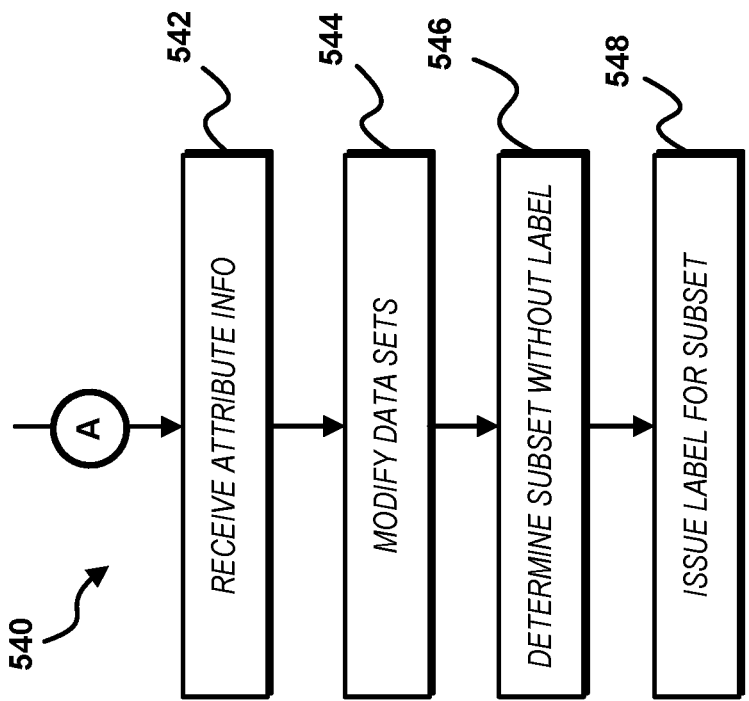

Referring to FIG. 5C, a method 540 shows an alternative continuation of method 500 at designator A. In a step 542, attribute information is received by the identity manager 20 via the collection API 106. The identity manager 20 modifies the plurality of data sets based on the received attribute information (step 544), determines a particular data subset of the plurality of data subsets does not have a label (step 546), and issues a particular label based for the particular data subset (step 548). Determining the particular data subset does not have a label can be performed for example by iteratively determining that the particular data subset cannot be further reduced. Issuing the particular label can be performed for example by graph reduction on a minimal non-reducible graph subset. A real world application of the method 540 may consider an entity representing a building which has been demolished, wherein a new building has been built in its place; a new label is issued to represent the new building in response to receiving attribute information identifying the new building. In another real world application of the method 540, an entity representing a real person who has died and the person's SSN is no longer valid; a new label is issued to represent the status of the decedent.

Referring to FIG. 5D, a method 560 shows another alternative continuation of method 500 at designator A. In a step 562, the identity manager 20 receives explicit labels of the plurality of entities. The labels can be received for example from a user via a client computer system 40, 42, 44 and the collection API 106, or from a particular network domain enabling a private data store 52 or a public data store 54. The identity manager 20 generates explicit connections comprising explicit weight conditions based on the explicit labels (step 564). The explicit weight conditions are reduced based on a probability function (step 566), and the plurality of data sets are separated into the plurality of data subsets further based on the explicit weight conditions of the explicit connection conditions to identify particular attributes of the plurality of data subsets (step 568). The method 560, since it relies on labels can take information from any suitable domain. For example, for an entity corresponding to a real person, attribute data can be gathered from SSN data stores, governmental data stores, and social media application data stores.

Figure 5E:
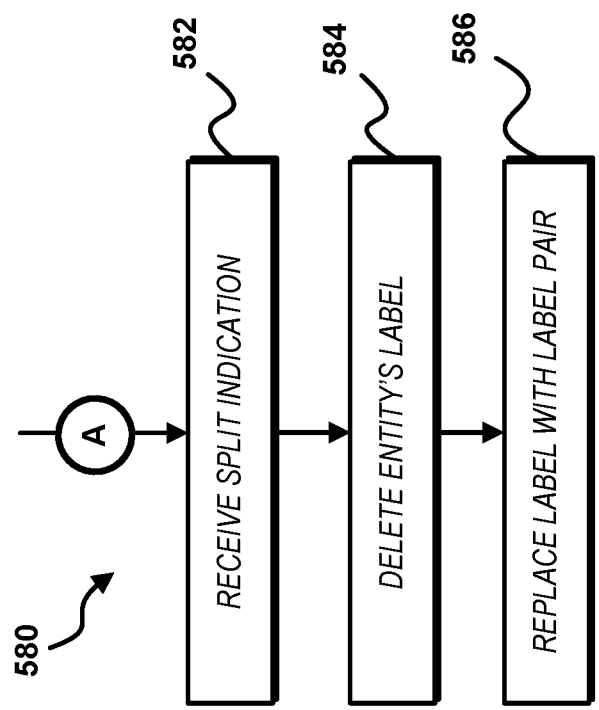

Referring to FIG. 5E, a method 580 shows a further alternative continuation of method 500 at designator A. In a step 582, the identity manager 20 receives an indication of a split of a particular entity of the plurality of entities. The identity manager 20 deletes a particular label of the particular entity (step 584) and replaces the particular label with a pair of labels comprising particular data sets of the plurality of data sets (step 586).

Additional domains can be added to the system enabled by the identity manager 20. For example, the system can be built without geospatial understanding, but geospatial support can be added later. The processes implemented by the identity manager 20 do not depend on domain. As long the entities are labeled, any applicable attribute can be added later, and with any degree of accuracy.

Beneficially, the least that is required in order to label an entity is a one to one unique identifier or a label, beneficially from a trusted source (e.g., a government data store).

The system enabled by the identity manager 20 can improve over time by the addition of more and more information to the connections that refine the weights, and therefore better results can be achieved.

Incorrect labels can be removed and deprecated. If an incorrect label exists, it can be identified by adding more information used by conditions, which affects the weighting result. As a result a subset is changed, and there are two labels for a single subset. One can be deprecated. For example if originally a label exists for the entity AB, but it later turns out that entity AB never really existed, and it was actually separate entities A and B, so AB can reassigned as A, and B can be issued a new label.

Label splits, when a label is split to two new labels, occur for example due to a real world event. Again this is a result of an effect on the connection weights which then produce a graph subset which has no label. A new label is issued. For example, a building entity has been demolished and two new buildings are created in its place, one of these with the same BIN. In this case, two new labels are formed for each new subset of the graph, which is unlike the reassignment of the above. Here AB is deprecated (i.e., dead), A is issued a new label, and B is issued a separate new label.

Information can be combined from different domains to make a determination that an entity is the same as another entity. There is beneficially no reference to domains in the described connection graphs. A condition can cross domains, therefore a connection, which is a result of a condition, can span any number of domains.

The identity manager 20 can enable a system which is human-augmented, by enabling humans to add explicit labels between entities for example via client computer systems 40, 42, 44. Explicit labels form "hard wired" connection added between sets of data, and the graph reduction takes into account these hard wired connections.

Beneficially, a lifecycle of a label and an entity are the same. An entity or label can be born or die. If an entity has split in the real world, this existing entity has in effect died, and new child entities will have new labels and are considered different entities.

The identity manager 20 enables various operations for example via the productivity portal 104. Exemplary operations include the following:
  a. Get (using an identifier);
  b. Get by label (returns properties for labels);
  c. Get by attribute search (even unique identifiers like address which have a many to one relationship are attributes);
  d. Add information about labels;
  e. Add unlabeled information to the pull of information;
  f. Add hard wired labels/connection/weights;
  g. Add conditions for resolving weights between sets of unlabeled data;
  h. Add separation conditions for graph subsets;
  i. Graph reduction and labeling under context (e.g., find all buildings); and
  j. Graph weight reduction underweight formula.

Figure 6:
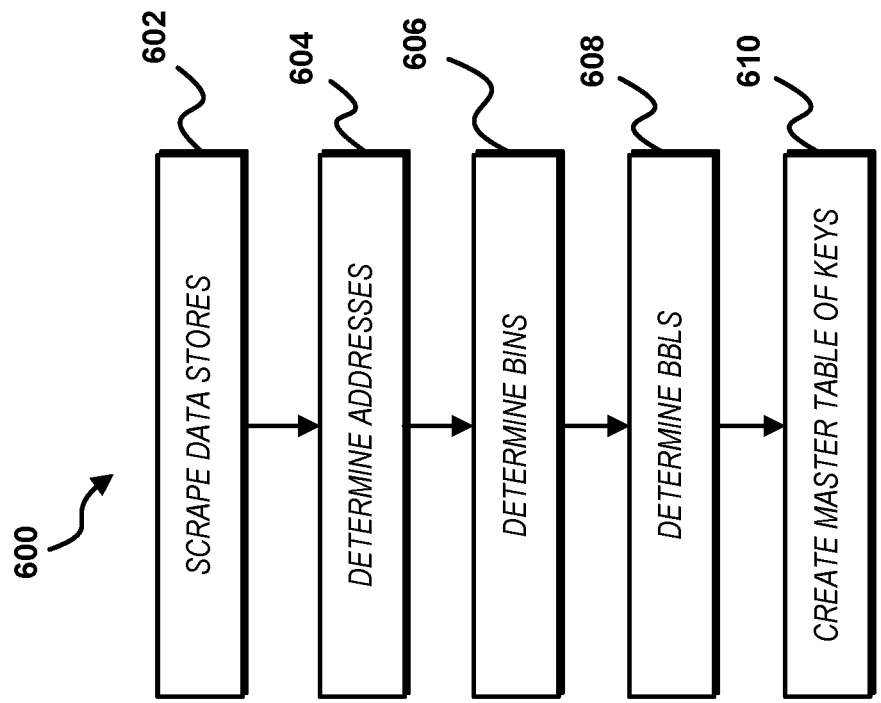
FIG. 6 is a flow chart describing a method of resolving a plurality of real-estate datasets.

Referring to FIG. 6, a flowchart shows a method 600 of resolving a plurality of real-estate datasets. While the method 600 and associated processes are described with reference to the components of the system 10 shown in FIG. 1, including the identity manager 20, the client computer systems 40, 42, 44, and the data stores 50, 52, 54, the method 600 may alternatively be performed via other suitable systems.

The method 600 includes scraping a plurality of network-accessible data stores 50, 52, 54 for address data, geographic coordinate data, building identification number ("BIN") data, and Borough/Block/Lot ("BBL") data corresponding to a particular geographic area and key data associated with the address data, the geographic coordinate data, the BIN data, and the BBL data (step 602). Particular addresses corresponding to at least the BIN data and BBL data are determined (step 604). Particular BINs corresponding to at least the BBL data and the address data are determined (step 606). Particular BBLs corresponding to at least the BIN data and the address data are determined (step 608), and a master table of keys are created based on the determining of the particular addresses, determining of the particular BINS, and determining of the particular BBLs and based on the key data (step 610).

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method for resolving entity identity comprising:
    recording a plurality of entities by denoting a plurality of attributes about the plurality of entities, the plurality of attributes comprising a plurality of labels comprising a plurality of data sets;
    receiving from a user explicit labels of the plurality of entities;
    determining a plurality of connection conditions between the plurality of data sets, the plurality of connection conditions comprising a plurality of weight conditions;
    generating explicit connection conditions comprising explicit weight conditions based on the explicit labels;
    reducing the plurality of weight conditions based on a probability function;
    reducing the explicit weight conditions based on the probability function;
    separating the plurality of data sets into a plurality of data subsets based on the plurality of weight conditions of the plurality of connection conditions and the explicit weight conditions of the explicit connection conditions to identify particular attributes of the plurality of data subsets; and
    transmitting the particular attributes of the plurality of data subsets.

2. The method of claim 1, wherein reducing the plurality of weight conditions comprises applying a multiplier to the plurality of weight conditions.

3. The method of claim 1, wherein reducing the plurality of weight conditions comprises applying an artificial intelligence classifier to the plurality of weight conditions.

4. The method of claim 1, further comprising applying an artificial neural network to the plurality of weight conditions to generate reduced weight conditions.

5. The method of claim 1, further comprising separating the plurality of data sets into the plurality of data subsets based on the plurality of weight conditions being less than a particular threshold.

6. The method of claim 1, further comprising separating a particular data set of the plurality of data sets into at least one particular data subset of the plurality of data subsets defining a particular entity based on a classifier using as an input a connection structure of the particular data set.

7. The method of claim 6, further comprising separating the particular data set into the at least one particular data subset by applying at least one of a nearest neighbor search or a second nearest neighbor search.

8. The method of claim 1, wherein each of the plurality of data subsets comprises:
    an attribute defining at least one of a one to one relationship or a many to one relationship;
    a label; and
    a label quality.

9. The method of claim 1, wherein:
    the plurality of entities comprises a plurality of real properties; and
    the plurality of attributes comprise sale prices of the plurality of real properties;
    the method further comprising estimating a particular price of a particular real property of the plurality of real properties based on an indicated selling price of at least one other of the plurality of real properties and at least one connection weight of at least one connection condition between the particular real property and the at least one other of the plurality of real properties.

10. The method of claim 9, wherein estimating the particular price comprises iteratively determining calculation anchors comprising particular subsets of the plurality of data subsets which cannot be further reduced.

11. The method of claim 1, further comprising:
    receiving attribute information and modifying the plurality of data sets based on the received attribute information;
    modifying the plurality of weight conditions;
    determining a particular data subset of the plurality of data subsets has multiple labels based on the modifying of the plurality of weight conditions; and
    deprecating at least one of the multiple labels.

12. The method of claim 11, wherein receiving the attribute information comprises receiving corrected attribute information.

13. The method of claim 1, further comprising:
    receiving attribute information and modifying the plurality of data sets based on the received attribute information;
    determining a particular data subset of the plurality of data subsets does not have a label; and
    issuing a particular label for the particular data subset.

14. The method of claim 13, wherein determining the particular data subset does not have a label comprises iteratively determining that the particular data subset cannot be further reduced.

15. The method of claim 1, further comprising:
    recording the plurality of attributes including the plurality of data sets from a plurality of domains; and determining the plurality of connection conditions between the plurality of data sets from the plurality of domains.

16. The method of claim 1, further comprising receiving from a particular network domain the explicit labels of the plurality of entities.

17. The method of claim 1, wherein each of the plurality of data subsets defines a single entity of the plurality of entities.

18. The method of claim 1, further comprising:
receiving an indication of a split of a particular entity of the plurality of entities;
deleting a particular label of the particular entity; and
replacing the particular label with a pair of labels comprising particular data sets of the plurality of data sets.

* * * * *